United States Patent [19]
Masaie et al.

[11] Patent Number: 5,672,287
[45] Date of Patent: Sep. 30, 1997

[54] FLUX-CORED WIRE AND SOLID WIRE FOR ARC WELDING

[75] Inventors: Norio Masaie; Tomoyuki Tachibana; Hiroyuki Shimizu; Kazuhiko Ito; Akira Matsuguchi, all of Fujisawa; Yoshikazu Sasa, Ibaraki; Atsushi Furuya, Kobe, all of Japan

[73] Assignee: Kabushiki Kaisha Kobe Seiko Sho, Kobe, Japan

[21] Appl. No.: 655,858

[22] Filed: May 31, 1996

Related U.S. Application Data

[62] Division of Ser. No. 421,252, Apr. 13, 1995, Pat. No. 5,550,348.

[30] Foreign Application Priority Data

May 6, 1994 [JP] Japan ............................ 6-94505
Jan. 5, 1995 [JP] Japan ............................ 7-00401

[51] Int. Cl.$^6$ .................................................. B23K 35/02
[52] U.S. Cl. ............................... 219/145.22; 219/145.31
[58] Field of Search ........................ 219/145.22, 145.31

[56] References Cited

U.S. PATENT DOCUMENTS 3,622,383  11/1971  Dane .
5,550,348  8/1996  Masaie et al. ................ 219/145.22

FOREIGN PATENT DOCUMENTS 50-146542  11/1975  Japan .
55-141395  11/1980  Japan .
7-32187    2/1995   Japan .
2 136 031  9/1984   United Kingdom .

OTHER PUBLICATIONS

Patent Abstracts of Japan, vol. 7, No. 250 (M–254) [1385], Nov. 8, 1983 & JP-A-58 135795 (Nitsutetsu) Aug. 12, 1983. Abstract.

Patent Abstracts of Japan, vol. 17, No. 298 (M–1425), Jun 8, 1993 & JP-A-05 023731 (Kawasaki Steel Corp) Feb. 2, 1993. Abstract.

Patent Abstracts of Japan vol. 5, No. 158 (M–91) [830], Oct. 12, 1981 & JP-A-56 084195 (Kobe Seiko Sho) Jul. 9, 1981. Abstract.

*Primary Examiner*—Clifford C. Shaw
*Attorney, Agent, or Firm*—Oblon, Spivak, McClelland, Maier & Neustadt, P.C.

[57] ABSTRACT

A flux-cored wire for arc welding, wherein a specific surface area, which is defined by the equation of $\{(Sa/Sm)-1\}$ where Sm is an apparent surface area and Sa is a real surface area in a region to be measured on a surface of the wire, is in the range of from 0.005 to 0.035; and molybdenum disulfide is stuck on the surface of the wire in an amount of from 0.004 to 0.24 g/m$^2$, and no plating is applied on the surface of the wire. Moreover, a solid wire for arc welding wherein the specific surface area $\{(Sa/Sm)-1\}$ is in the range of from 0.0005 to 0.05; and molybdenum disulfide is stuck on the surface of the wire in an amount of from 0.001 to 0.5 g/m$^2$, and no plating is applied on the surface of the wire.

9 Claims, 5 Drawing Sheets

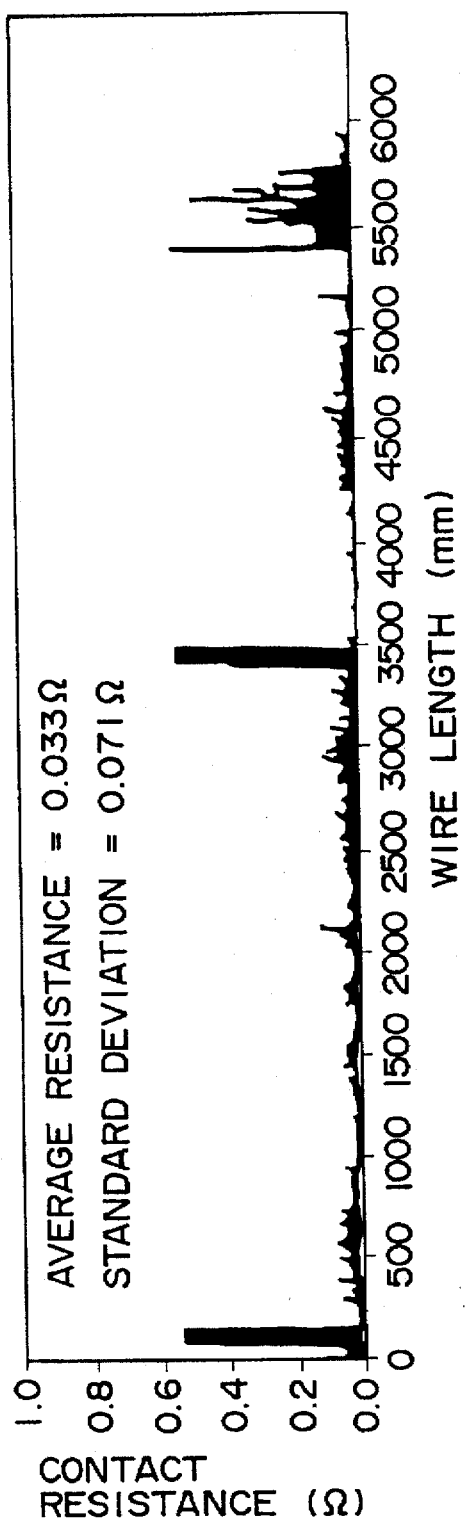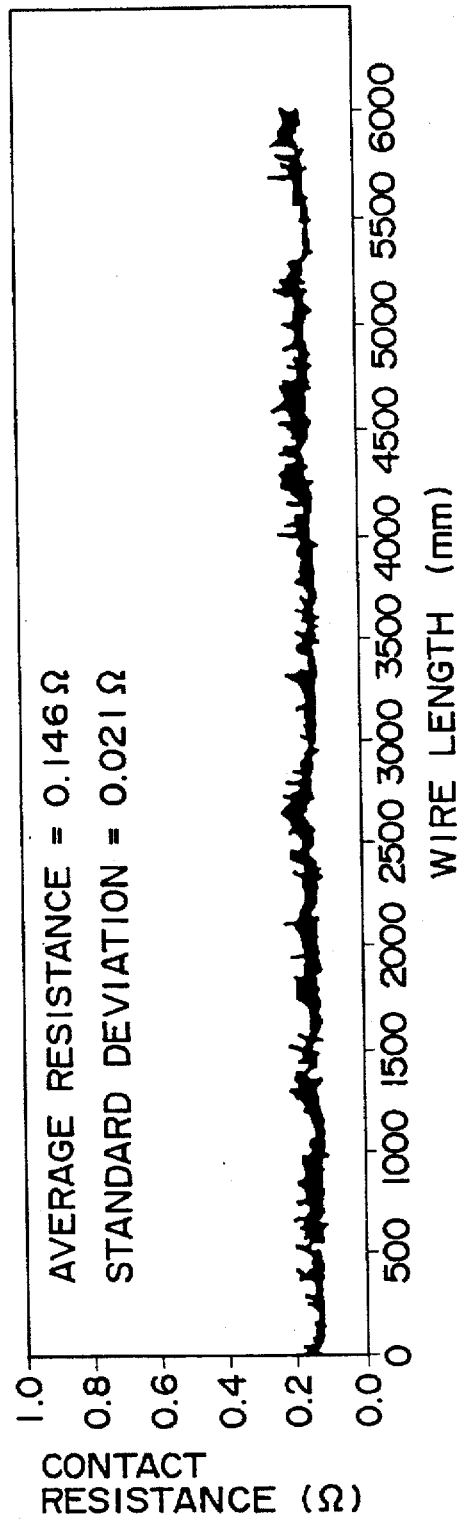

FLUX-CORED WIRE AND SOLID WIRE FOR ARC WELDING

This is a Division of application Ser. No. 08/421,252 filed on Apr. 13, 1995, now U.S. Pat. No. 5,550,348.

BACKGROUND OF THE INVENTION

1. Field of the Invention

The present invention relates to wires for arc welding, particularly, a flux-cored wire and a solid wire for arc welding, which are improved in arc stability by sticking molybdenum disulfide (hereinafter, referred to as $MoS_2$) on the surfaces thereof, without provision of any plating.

2. Description of the Related Art

Solid wires used for welding mild steel in a protective atmosphere such as carbon dioxide or argon gas have been generally applied with copper plating on the surface layers thereof. These wires have been generally used by a method wherein, for example, a wire having a small diameter ranging from 0.9 to 1.6 mm is fed to a portion to be welded at a welding rate of from 1 to 20 m/min, and it is applied with a large welding current of from 80 to 500 A for melting the portion to be welded. Copper plating has been considered to be effective to improve wire feedability, to enhance current-carrying characteristic between a feeding point (welding tip) and a wire, and to improve rust resistance of wires during storage. Recently, from the viewpoint of operability, there have been strong demands towards continuous welding for a long term using robots and automatic welders, and to meet these demands, it has become further important to improve the wire feedability, current-carrying characteristic between a tip and a wire, and wear resistance of a tip.

However, it has been pointed out that even copper plating wires have an essential disadvantage in introducing arc instability and thereby increasing the amount of spatter. The reason for this is as follows: namely, copper plating is possibly separated from a wire due to the unevenness of the plating depending on manufacturing variations, and due to the friction between the wire and a conduit liner occurring in a drawing process after plating and during wire feeding, so that the base metal of Fe is exposed, thus obstructing the stable current-carrying.

To solve the above disadvantage, it may be considered to increase the amount of copper plating. However, if so, the copper plating is rather made easier to be separated; and it presents another disadvantages that during welding, hazardous fume containing copper and copper oxides is generated in a large amount, which is very undesirable in terms of the welding environment, and further, the amount of copper in weld metal is increased, which leads to high temperature cracking.

Of the copper plating wires, there has been known a wire of a type in which an oxygen-rich layer is produced on the surface of the wire by adjustment of annealing temperature and atmosphere in manufacturing processes, to lower the surface tension of droplet upon welding, thereby improving arc stability and reducing the amount of spatter.

The above wire, however, is intended to refine droplet, and is not effective in improving current-carrying stability. Moreover, in general, the intergranular-oxidized wire is relatively large in surface irregularities in addition to the presence of the oxidized layer, so that the copper plating is rather made easier to be separated from the wire, which exerts adverse effect on current-carrying stability.

In view of the foregoing, it is essential to apply a suitable surface treatment in place of copper plating. In other words, the presence of copper plating on the surface of a wire is undesirable, and thus it is essential to eliminate the copper plating and to apply a suitable surface treatment capable of satisfying various characteristics.

Wires with no copper plating have been proposed, for example in Examined Japanese Patent Publication Nos. SHO 55-128395, SHO 53-6247 and SHO 53-3940, and Unexamined Japanese Patent Publication No. SHO 49-91950. These prior arts are intended to improve wire feedability, current-carrying stability between a tip and a wire, and rust resistance by coating $MoS_2$, graphite, zinc dithiophosphate, lubricating oil, inhibitor and the like in a suitable amount on the surface of a wire.

The above techniques, however, are insufficient in improvement of wire feedability and current-carrying stability.

Unexamined Japanese Patent Publication No. HEI 6-262389 discloses a wire coated with organic molybdenum on the surface thereof for improving wire feedability. This wire is effective in wire feedability; but is not effective in current-carrying stability.

The above prior arts have also failed to essentially solve such a problem that the rust resistance of a wire with no copper plating is poor as compared with that of a copper plating wire.

SUMMARY OF THE INVENTION

An object of the present invention is to provide a no plating wire for arc welding which is capable of satisfying characteristics such as wire feedability, current-carrying stability between a tip and a wire, and rust resistance.

To achieve the above object, according to a first aspect of the present invention, there is provided a flux-cored wire for arc welding, wherein a specific surface area on the surface of the wire which is defined by the following equation is in the range of from 0.005 to 0.035, $$\text{specific surface area} = (Sa/Sm) - 1$$

where

Sa: a real surface area ($mm^2$) in a region to be measured on surface of wire, and Sm: an apparent surface area ($mm^2$) in the region to be measured on the surface of the wire; and wherein molybdenum disulfide is stuck on the surface of the wire in an amount of from 0.004 to 0.24 $g/m^2$, and no plating is applied on the surface of the wire.

To achieve the above object, according to a second aspect of the present invention, there is provided a solid wire for arc welding, wherein a specific surface area on the surface of the wire which is defined by the above equation is in the range of from 0.0005 to 0.05; and wherein molybdenum disulfide is stuck on the surface of the wire in an amount of from 0.001 to 0.5 $g/m^2$, and no plating is applied on the surface of the wire.

BRIEF DESCRIPTION OF THE DRAWINGS

FIGS. 1A and 1B are graphs each showing a relationship between surface irregularities and the amount of $MoS^2$, and the contact resistance, wherein FIG. 1A shows the case where the surface of a wire is smooth, and FIG. 1B shows the case where suitable irregularities and $MoS_2$ are present on the surface of the wire;

FIGS. 8 and 9 are views each showing a device for measuring feeding resistance, wherein FIG. 8 shows the case where a feeding system is severe, and FIG. 9 shows the case where a feeding system is normal.

DESCRIPTION OF THE PREFERRED EMBODIMENTS

Figure 2:
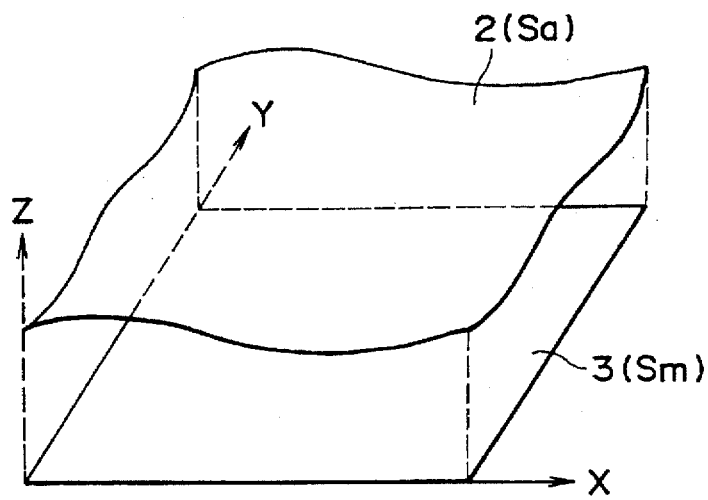
FIG. 2 is a typical view showing a real surface in a micro-region on the surface of a wire using a three-dimensional orthogonal coordinate system.

The present inventors have studied to solve the above-described disadvantages of the prior art wires, and found that a wire having the surface uniformly stuck with a suitable amount of $MoS_2$ is excellent in wire feedability and current-carrying stability between a tip and a wire.

It has been also found that $MoS_2$ is easy to be uniformly stuck on the surface of a wire having suitable irregularities. On the surface of a wire having suitable irregularities, $MoS_2$ is trapped in recessed portions of the irregularities, that is, easily remains on the surface of the wire, and is thus uniformly stuck thereon; and further, by the anchor effect of the irregularities, $MoS_2$ is difficult to be separated from the surface of the wire.

The conventional studies on no plating wires have intended to reduce the contact resistances (current-carrying resistances) to a degree comparative to that of a copper plating wire. Therefore, the smoothness of the surface of a wire has been regarded as most important.

However, various researches have showed that as the contact resistance is lowered, the possibility of abruptly generating arc instability during welding is increased.

As a result of examination for the wires in which arc instability was introduced and a large amount of spatter was generated, it has been found that a variation in contact resistance causes arc instability and a large amount of spatter.

In terms of the variation in contact resistance, all of the examined wires were in the same level. It seems that in the wire lower in contact resistance, the variation in contact resistance exerts a large effect on the current-carrying characteristic and arc stability of the wire.

Since a variation in contact resistance is also affected by surface properties (smoothness, and sticking of lubricant and the other foreign matters) of a wire, it is difficult to reduce the variation in contact resistance at the same level as that of copper plating.

Differently from the prior art thought, the present inventors have conceived that in the case where the variation in contact resistance is in the same level, by increasing the contact resistance, it can be achieved to reduce the effect of the variation in contact resistance on current-carrying characteristic and arc stability.

In this regard, the contact resistance of a wire was increased by suitably controlling the surface properties of the wire, as a result of which the wire showed the excellent arc stability equal to or more than that of a copper plating wire, thereby significantly reducing the spatter generation amount. FIGS. 1A and 1B are graphs each showing a relationship between the wire length (abscissa) and the contact resistance (ordinate), wherein FIG. 1A shows the case where the surface of a wire is smooth (average resistance=0.033 Ω, and standard deviation=0.071 Ω), and FIG. 1B shows the case where suitable irregularities and $MoS_2$ present on the surface of a wire (average resistance= 0.146 Ω, and standard deviation=0.021 Ω).

As is apparent from FIGS. 1A and 1B, as compared with the case where the surface of a wire is smooth, in the case where suitable irregularities and $MoS_2$ present on the surface of a wire, the average contact resistance is high but the variation thereof is extremely low.

The followings must be examined to uniformly stick $MoS_2$ on the surface of a wire. First, the irregularities (roughness) of the surface of a wire, which is essential for the present invention, must be specified. The reason for this are previously described. Next, as for wet coating of $MoS_2$, it becomes important to ensure the dispersion stability of $MoS_2$ in a $MoS_2$ dispersion solution, specifically, to adjust the viscosity of the solution and to select an optimum dispersion stabilizer; and in some cases, for achieving the uniform coating, it is necessary to employ electrostatic coating (for a final product, or semi-finished product before skin pass). On the other hand, as for dry coating of $MoS_2$, for example, in the case where $MoS_2$ is added in a dry lubricant and is press-contacted with the surface of a wire by drawing, it becomes important to enhance fluidity of the dry lubricant, and to allow $MoS_2$ to uniformly remain on the surface of the wire by suitably controlling wire surface treatment conditions after drawing (for example, dry polishing, wet cleaning, pickling, and heat-treatment). In addition, the wire of the present invention has no copper plating and $MoS_2$ as the cause of rust is directly stuck on the surface of the base metal of Fe; accordingly, the rust resistance must be sufficiently ensured, concretely, by the pH control on the surface of the wire (pH: 3.5 to 10), the use of an inhibitor, and combination thereof.

In the flux-cored wire for arc welding according to the present invention, the specific surface area defined by the above equation is in the range of from 0.005 to 0.35, and molybdenum disulfide is stuck on the surface of the wire in an amount of from 0.004 to 0.24 g/m², and no plating is applied on the surface of the wire.

In a solid wire for arc welding according to the present invention, the specific surface area defined by the above equation is in the range of from 0.0005 to 0.05, and molybdenum disulfide is stuck on the surface of the wire in an amount of from 0.001 to 0.5 g/m², and no plating is applied on the surface of the wire.

The real surface area Sa on the surface of a wire specified in the above equation is obtained by three-dimensionally measuring fine irregularities on the surface of the wire.

Figure 3:
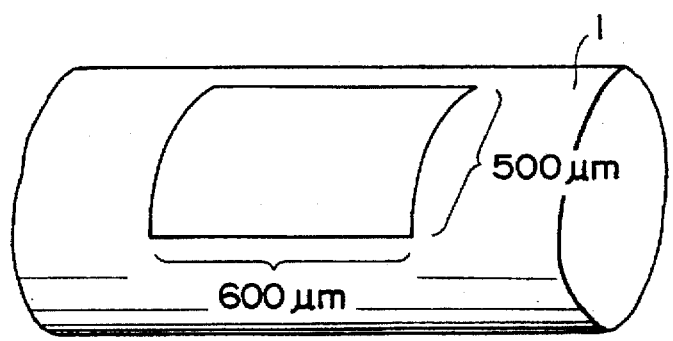
FIG. 3 is a typical view showing a measurement area for measuring a specific surface area of the surface of a wire.
Figure 4:
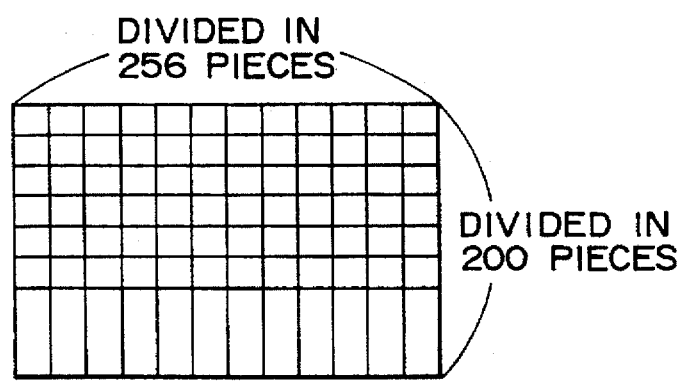
FIG. 4 is a typical view showing meshes which divide the measurement area for calculating a real surface.
Figure 5:
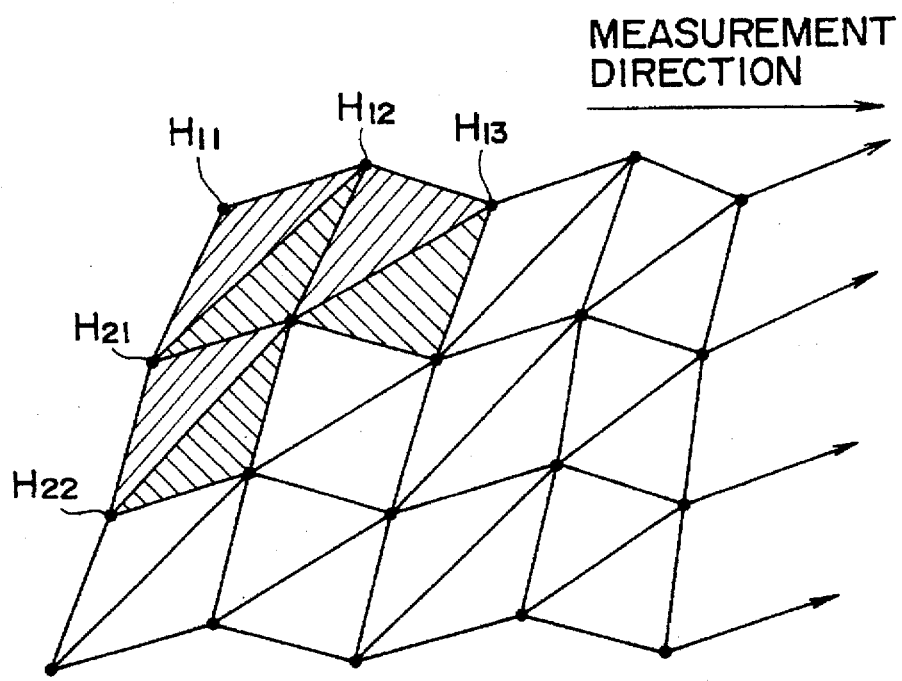
FIG. 5 is a typical view showing the height of a real surface at each intersection of the meshes using the three-dimensional coordinate system for approximating the real surface by the connection of triangles.
Figure 6:
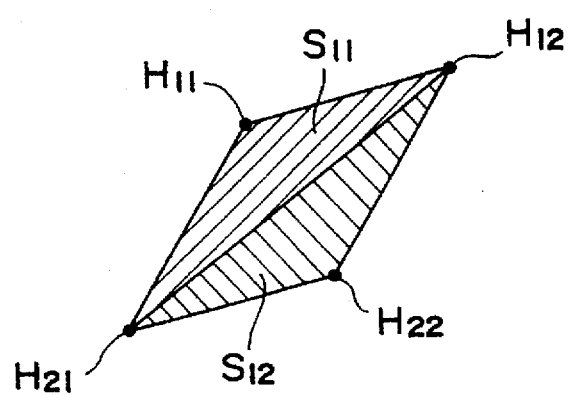
FIG. 6 is a typical view showing a method of calculating the area of each triangle shown in FIG. 6.

Hereinafter, a method of measuring a specific surface area will be described. FIG. 2 shows a micro-portion of a wire surface using a three-dimensional orthogonal coordinate system. In this figure, a real surface 2 of a wire has irregularities, and the area Sa of the real surface 2 is larger than an area Sm of an apparent surface 3 obtained by projection of the real surface 2 on the X-Y plane. As shown in FIG. 3, a measurement region (measurement field) having a longitudinal length (hereinafter, referred to as lateral length) of 600 μm and a peripheral length (hereinafter, referred to as vertical length) of 500 μm is taken on the surface of a wire 1. This measurement region is developed in plane as shown in FIG. 4, and in this developed measurement region, the lateral length is divided into 256 parts and the vertical length is divided into 200 parts, to form finite sections in the number of 256×200 pieces. Next, the position of the real surface at each intersection of the meshes (that is, the height of the real surface) is measured. In the three-dimensional orthogonal coordinate system shown in FIG. 2, the X-Y plane is equivalent to the measurement field, and the heights H11, H12, and the like of the real surface (see FIG. 5) are obtained as values along the X axis. The positions such as the heights H11, H12 and the like are connected to each other in such a manner that each triangle is formed by connection of the adjacent three points as shown in FIG. 5. The real surface is approximated by linking of a lot of triangles obtained by connection of the heights H11, H12, H21 and the like. Thus, the real surface area Sa can be obtained by calculating each of the areas S11, S12 and the like of these triangles, and totaling all of the areas.

The heights H11, H12 and the like of the real surface at the intersections of the meshes in this measurement field can be measured by an electron beam three-dimensional roughness analyzer. The three-dimensional roughness analyzer is one kind of SEM (Scanning Electron Microscope), which is adapted to obtain positional information in the three-dimensional system (X, Y, Z) by irradiation an electron in the direction substantially perpendicular to a sample plane, detecting a secondary electron by four detectors in the four directions equally divided from the electron beam irradiating point, and computing the detection result by a microcomputer.

The apparent surface area Sm is the area of the measurement region (measurement field), that is, Sm=500 (μm)×600 (μm)=300000 (μm$^2$).

On the basis of the apparent surface area Sm, and the real surface area Sa in consideration of the irregularities of the real surface, the wire specific surface area is obtained according to the above-described equation {(Sa/Sm)−1}.

When the real surface area is actually obtained, it is required to check the absence of scratch on the wire surface and sufficiently remove impurities stuck on the wire surface in the measurement region of the real surface. Moreover, the wire specific surface is given by an average of measured values at a plurality of portions {for example, nine portions (three test pieces x three portions)} of the wire surface.

By increasing the division number of the meshes shown in FIG. 4, the measured value of the real surface area can be furthermore close to the true value. However, the specific surface area obtained by dividing the region (500 μm×600 μm) into 200×256 pieces as described above shows the excellent correlation with arc stability, and which is sufficient to evaluate a wire. On the other hand, when the mesh is made finer than in the above case, the analysis by a computer takes a lot of time, and further the accuracy in evaluating a wire is not enhanced so much. Accordingly, in the present invention, the specific surface area measured on the basis of the meshes obtained by dividing the measurement region or measurement field (500 μm×600 μm) into 200×256 pieces is specified in claims.

The surface roughness of a wire has been measured by an SEM or a probe method specified in JISB0601 and JISB0 651. However, in the probe method, it is difficult to detect the irregularities smaller than the curvature of the leading edge of a probe. Moreover, the condition of a wire surface obtained by the probe method is not necessarily identical to that obtained by the observation by an SEM. Consequently, there has been recognized no correlation between the condition of the surface of a wire and arc stability.

However, by three-dimensionally measuring fine irregularities according to the present invention, there can be recognized a specified relationship between the surface roughness and arc stability. The reason for this is that the contact area between a wire and a welding tip is increased by suppressing the surface of a wire in a specified value or less, to lower a current density per unit surface, thus smoothly carrying a current.

Additionally, as described above, the measurement region has the area of 500 μm×600 μm (300000 μm$^2$) in the state that the surface of a wire main body is developed.

In the present invention, the specific surface area and the amounts of matters stuck on the surface of a wire are specified as follows:

(A) Flux-cored Wire
$MoS_2$:0.004 to 0.24 g/m$^2$

When the amount of $MoS_2$ on the surface of a wire is more than 0.24 g/m$^2$, rust is produced on the surface of the wire due to the presence of S compounds contained in $MoS_2$. On the other hand, when it is less than 0.004 g/m$^2$, the feeding resistance of a wire is increased, and the current-carrying stability at a high temperature at a current-feeding point during welding is deteriorated thereby reducing arc stability. Accordingly, the amount of $MoS_2$ stuck on the surface of a wire is specified to be in the range of from 0.004 to 0.24 g/m$^2$.

Specific surface area: 0.005 to 0.035

A specific surface area, which is expressed by the equation {(Sa/Sm)−1} where Sm is an apparent surface area and Sa is a real surface area in a region to be measured on the surface of a wire, is required to be in the range of from 0.005 to 0.035. When it is more than 0.035, the irregularities on the surface of a wire is excessively large, so that most of $MoS_2$ particles are buried in recessed portions of the irregularities and the amount of the remaining $MoS_2$ particles at projecting portions of the irregularities is made small, failing to achieve the sufficient lubricating effect by $MoS_2$, thereby reducing wire feedability and arc stability. On the other hand, when it is less than 0.005, the surface of a wire is excessively smooth, and it becomes difficult to hold $MoS_2$ on the surface of the wire, thus failing to achieve the sufficient lubricating effect by $MoS_2$. Accordingly, the specific surface area is specified to be in the range of from 0.005 to 0.035, preferably, in the range of from 0.005 to 0.015.

Conventionally, the specific surface area has not been taken into account, and accordingly it has been very difficult to improve both wire feedability and rust resistance. However, by specifying the specific surface area in the above-described range, wire feedability as well as rust resistance can be sufficiently improved by the effect of $MoS_2$ in the amount specified as described above.

Oil on Wire Surface: 0.04 to 0.50 g/m$^2$

In the wire of the present invention, as described above, the specific surface area is set to be in the specified range and $MoS_2$ in a specified amount is stuck on the surface of a wire, so that wire feedability is excellent without any lubricating oil. However, for further improving the wire feedability, lubricating oil is preferably stuck on the surface of the wire. By sticking oil as well as $MoS_2$ on the surface of a wire, it becomes possible to avoid the direct contact between $MoS_2$ and moisture as the cause of rust, and hence to significantly improve rust resistance. Moreover, in this case, as compared with the case where only $MoS_2$ exists, the frictional coefficient of $MoS_2$ is reduced to further improve the wire feedability; and further, since $MoS_2$ is uniformly dispersed on the surface of the wire by the effect of the presence of oil, the current-carrying characteristic at a high temperature at a current-feeding point is stabilized during welding, which is significantly suitable for continuous welding.

When the amount of lubricating oil on the surface of a wire is more than 0.50 $g/m^2$, the amount of diffusible hydrogen in weld metal is increased. On the other hand, when it is less than 0.04 $g/m^2$, $MoS_2$ cannot be uniformly dispersed, that is, it is localized on the surface of a wire, which tends to cause rust. Accordingly, in the case where lubricating oil is stuck on the surface of wire, the amount thereof is preferably in the range of from 0.04 to 0.50 $g/m^2$.

Matters to be Stuck on Wire Surface: 0.80 $g/n^2$ or Less, and Fe Powder and Fe Compound: 0.15 $/m^2$ or Less Matters to be stuck on the surface of a wire, which include lubricant, peeled-off sheath metal, and flux, tend to clog a feeding system upon continuous welding for a long term. In particular, Fe powder and a Fe compound are easy to cause clogging. Accordingly, the amount of matters to be stuck on the surface of a wire is specified to be in the range of 0.80 $g/m^2$, and the total amount of Fe powder and a Fe compound is preferably specified to be in the range of 0.15 $g/m^2$ or less (Fe-converted value).

Ca Compound on Wire Surface: 0.003 to 0.16 $g/m^2$

Upon continuous welding for a long term, when the amount of a Ca compound on the surface of a wire is more than 0.16 $g/m^2$, there occurs a failure in current-carrying, resulting in arc instability. Accordingly, the amount of a Ca compound is preferably in the range of 0.16 $g/m^2$ or less (Ca-converted value). However, upon drawing a wire, by mixing a Ca compound with drawing lubricant, wire-drawability is improved, and the amount of $MoS_2$ stuck on the surface of a wire can be controlled. Although $MoS_2$ on the surface of a wire exhibits a strong acidic property, a Ca compound acts to neutralize the acidic property of $MoS_2$ and to improve the rust resistance of the wire. Consequently, it is desirable to mix a Ca compound with drawing lubricant. In this case, when the amount of a Ca compound on the surface of a wire is less than 0.003 $g/m^2$, the above effect cannot be sufficiently achieved. On the other hand, when it is more than 0.16 $g/m^2$, as described above, there occurs a failure in current-carrying resulting in arc instability. Accordingly, the amount of a Ca compound on the surface of a wire is preferably in the range of from 0.003 to 0.16 $g/m^2$ (Ca-converted value).

(B) Solid Wire

Specific Surface Area: 0.0005 to 0.05

When the specific surface area of a wire defined as described is more than 0.05, the irregularities on the surface of the wire are increased, which leads to an increase in feeding frictional resistance, resulting in the poor wire feedability; and further, $MoS_2$ particles are trapped in large recessed portions of the irregularities, failing to achieve the effect of current-carrying stability. On the other hand, when it is less than 0.0005, the surface of the wire is excessively smooth, so that it is difficult to uniformly hold $MoS_2$ on the surface of the wire, failing to ensure current-carrying stability.

In a severe feeding system, upon continuous welding for a long term, $MoS_2$ particles are dropped off the surface of a wire, and the $MoS_2$ particles thus dropped clog the interior of a conduit cable, which leads to a failure in wire feeding. For suppressing the drop of $MoS_2$ particles from the surface of a wire, it is desirable to leave the wire as not cleaned and to specify the specific surface area in the range of from 0.0008 to 0.08. In this case, the specific surface area of the wire surface is in the range of from 0.0005 to 0.05.

$MoS_2$: 0.001 to 0.5 $g/m^2$

When the amount of $MoS_2$ on the surface of a wire is more than 0.5 $g/m^2$, there occur various problems such as the clogging of $MoS_2$ particles in a feeding system during welding, generation of rust on the surface of the wire due to the presence of S in $MoS_2$, and generation of high temperature cracking due to an increase in S in weld metal and blackening of the appearance of the wire. On the other hand, when it is less than 0.001, wire feedability is deteriorated and also the effect of current-carrying stability cannot be achieved.

In consideration of the effect of current-carrying stability and wire feedability, a relationship between the amount of $MoS_2$ on the surface of a wire and the specific surface area is preferably specified as follows:

$0.1 \leq MoS_2/\text{specific surface area} \leq 50$

Upon welding in a severe feeding system requiring higher current-carrying stability, a solid conductive material represented by C (carbon) or other semiconducting materials may be added in an amount of from 0.001 to 0.035 $g/m^2$ for further enhancing the current-carrying stability.

In the present invention, the particle size of $MoS_2$ is not particularly limited because $MoS_2$ particles are easily solidified in flake shapes; however, in consideration of the sticking of $MoS_2$ on the surface of a wire, the average particle size of $MoS_2$ is preferably in the range of from 0.1 to 10 μm.

Lubricating Oil: 0.01 to 0.5 $g/m^2$

In the wire of the present invention, since the specific surface area is set in the specific range and also $MoS_2$ in a specified amount is stuck on the surface of a wire, wire feedability is excellent without any lubricating oil. However, to further enhance the wire-feedability, lubricating oil is preferably stuck on the surface of a wire. By sticking lubricating oil as well as $MoS_2$ on the surface of a wire, it becomes possible to avoid the direct contact between $MoS_2$ and moisture as the cause of rust, and hence to extremely improve the rust resistance of the wire. In this case, when the amount of lubricating oil on the surface of a wire is more than 0.5 $g/m^2$, the amount of diffusible hydrogen in weld metal is increased. On the other hand, it is less than 0.01 $g/m^2$, wire-feedability cannot be achieved. In consideration of rust resistance, the amount of lubricating oil is preferably in the range of from 0.05 to 0.5 $g/m^2$.

Alkali Metal: 0.0005 to 0.010 $mol/m^2$

Each of alkali metals (Li, Na, K, Rb, and Cs) is low in potential gradient, that is, it is low in ionization energy. As a consequence, the addition of alkali metals has been considered to be effective in arc stability. However, these alkali metals must be stuck on a wire so as not to obstruct current-carrying characteristic. In the present invention, it was confirmed that the sticking of alkali metals in the following range does not obstruct the current-carrying characteristic. In addition, the term "alkali metal" means a mixture or compound (inorganic, organic) containing an alkali metal.

When the amount of alkali metals (one kind or two or more kinds of Li, Na, K, Rb and Cs) stuck on the surface of a wire is more than 0.010 $mol/m^2$, current-carrying characteristic is obstructed, failing to obtain excellent arc stability. On the other hand, when it is less than 0.0005 $mol/m^2$, it fails to improve arc stability and to reduce the amount of spatter. In consideration of improvement of arc stability and reduction in the amount of spatter, the amount of alkali metals is preferably in the range of from 0.002 to 0.1 $mol/m^2$ (the total of each alkali-metal converted value).

Matters Stuck on Surface: 2.0 g/m² or less

Matters stuck on the surface of a wire, such as $MoS_2$, lubricant, C (carbon), alkali metals, and inevitable impurities generated during manufacturing processes, tend to clog a feeding system upon continuous welding for a long term. Accordingly, the amount of the matters stuck on the surface of a wire is preferably in the range of 2.0 g/m² or less; and further, in the consideration of welding in a severe feeding system, it is preferably in the range of 1.0 g/m² or less.

Oxygen in Surface Layer of Wire: 100 to 1000 ppm, Total Oxygen in Wire: 70 ppm or less Conventionally, there has been known a technique of controlling the concentration of oxygen in a wire for making spray-like transfer of droplet thereby improving the droplet transfer of a solid wire. The reason for this is that the concentration of oxygen exerts an effect on the viscosity and surface tension of droplet. In the present invention, the presence of $MoS_2$ on the surface of a wire exerts an effect on the droplet transfer (in a spray shape) because S in $MoS_2$ has the same effect as that of oxygen; however, the effect is not sufficient. Accordingly, by controlling the concentration of oxygen in surface layer and the total oxygen in a wire, the above effect can be further improved.

When the concentration of oxygen in a surface layer is more than 1000 ppm, the conductivity on the surface of a wire is reduced, to deteriorate the current-carrying characteristic, failing to obtain excellent arc stability. On the other hand, when it is less than 100 ppm, the effect on the droplet transfer cannot be confirmed. When the concentration of total oxygen in a wire is more than 70 ppm, the conductivity on the surface of droplet is made insufficient, thus increasing the micro-short circuiting transfer; and further, the concentration of oxygen in weld metal is increased thereby deteriorating mechanical properties.

In addition, the term "concentration of oxygen in a surface layer" means the concentration of oxygen in a portion having a depth of from about 0.05 to 0.2 mm from the surface of a wire.

The present invention relates to a flux-cored wire and a solid wire with no plating; however, it may be applied to a wire for SAW (submerged arc welding) in terms of the operational effect.

The present invention will be more clearly understood by way of the following examples.

(Example A)

Flux-cored wires of the present invention were actually manufactured and examined in continuous welding performance in comparison with comparative examples. First, flux-cored wires (no plating), each having a mild steel sheath filled with flux, were manufactured. In the manufacturing process, $MoS_2$ and/or lubricating oil was stuck on the surface of each wire. The amounts of $MoS_2$ and lubricating oil stuck on the surface of each wire, and the specific surface area were measured as follows:

Amount of $MoS_2$

① First, four test pieces each having a length of 25 cm were cut from each wire. The surface of each test piece was wiped with absorbent cotton previously dipped in solvent (chloroform). In this case, the wiping of the surface of the test piece was repeated by five times using new absorbent cotton for each time.

② The absorbent cotton used for wiping of the surface of the test piece was dissolved in 50 g of an aqua regia solution {12.8 g (36 wt %) of HCl+37.16 g (60 wt %) of $HNO_3$}, and the solution was heated at 70° C.

③ The solution was added with 150 mg (three times, 50 mg for each time) of a cleaning liquid used for cleaning a vessel in which the absorbent cotton used for wiping was put. The volume of the solution added with the cleaning liquid was 1000 ml.

④ The concentration of Mo in the solution added with the cleaning liquid was measured by an atomic absorption analysis or induction coupling plasma (ICP) method.

⑤ On the basis of the concentration of Mo thus measured, the amount of $MoS_2$ per unit area (1m²) on the surface of a wire was calculated. In calculating the surface area of the wire, the nominal size of the wire was taken as the radius thereof.

Specific Surface Area

① Three test pieces each having a length of about 20 mm were cut from each wire wound around a spool. In cutting the wire, portions having no flaw on the surface were selected. The surface of the test piece was subjected to ultrasonic cleaning using an organic solvent being less liable to corrode the test piece (for example, petroleum ether, acetone, carbon tetrachloride or fron) for removing contamination and impurities such as fats and oils stuck on the surface of the wire. In this case, to prevent the test pieces from being scratched by mutual rubbing, the ultrasonic cleaning was made for each test piece. As the cleaning liquid for ultrasonic cleaning, any of liquids suitable for removal of lubricant used for machining (hot water or other degreasing liquids) may be used in place of the above organic solvent.

② Each test piece was divided into three parts in the circumferential direction, and at each divided position, a real surface area in a region of 500 μm (vertical)×600 μm (horizontal) (apparent surface area Sm=300000 μm²) was measured using an electron beam three-dimensional roughness analyzer (for example, sold by Elyonix Co., Ltd. under the trade name "ERA-8000"). The average of the measured real surface areas was calculated, and it was taken as the real surface area Sa of the wire. In addition, the measurement magnification was set at constant (150 times) irrespective of the diameter of the wire.

③ The specific surface area {(Sa/Sm)−1} of the wire was calculated on the basis of the apparent surface area Sm and the real surface area Sa.

Amount of Lubricating Oil

The amount of lubricating oil stuck on the surface of a wire was determined as follows (in accordance with JIS K0102-25, 26):

① First, four test pieces each having a length of 25 cm were cut from a wire. The surface of each test piece was wiped with absorbent cotton previously dipped in solvent (carbon tetrachloride). In this case, the wiping of the surface of the test piece was repeated by five times using new absorbent cotton for each time.

② Carbon tetrachloride in an amount of 10 ml was added into a vessel in which the absorbent cotton for wiping was put. The liquid of carbon tetrachloride was made to be absorbed in the absorbent cotton, and was then transferred into a flask.

③ The carbon tetrachloride absorbed in the absorbent cotton was squeezed by a glass bar or the like, and the carbon tetrachloride thus squeezed was transferred into the above flask.

④ The above steps ② and ③ are repeated by three times.

⑤ The carbon tetrachloride in the above flask was transferred into a measuring flask of 50 ml. The above flask was then cleaned by carbon tetrachloride in an amount of about 10 ml, and the cleaning liquid of the carbon tetrachloride was also transferred into the measuring flask.

⑥ Carbon tetrachloride was added in the measuring flask up to the reference line (50 ml).

⑦ The oil content in the solution was determined using an infrared spectroscopic analysis (IR). In this case, the working curve was prepared in the following manner. First, the solution in the measuring flask was put in an infrared measuring cell (made of quartz) having a length of 50 mm, and was measured in the absorbing degree near a wavelength of 3.4 μm. The lubricating oil to be measured in an amount of 2 g was then diluted in 200 ml by addition of carbon tetrachloride, thus obtaining a diluted solution (S1). The diluted solution S1 in an amount of 2 ml was added with carbon tetrachloride to be diluted in 200 ml, thus obtaining a diluted solution S2. The diluted solution S2 in each of the amounts of 2 ml, 10 ml and 40 ml was added with carbon tetrachloride to be diluted in 200 ml, thus obtaining each standard sample having each of the concentrations of oil in the solution of 0.002 mg/ml, 0.01 mg/ml and 0.04 mg/ml.

The standard sample was measured by the infrared spectroscopic analysis, to thus obtain the working curve. Using the working curve thus obtained, the amount of the lubricating oil on the surface of the test piece was measured. On the basis of the amount of the lubricating oil thus measured, the oil content per unit surface area of the wire was calculated. In calculating the surface area of the wire, the nominal size of the wire was taken as the radius thereof.

The amount of matters stuck on the surface of the wire, such as lubricant, peeled-off sheath metal, and flux; the amount of Fe powder and a Fe compound; and the amount of a Ca compound present on the surface of the wire were determined by the atomic absorption analysis or ICP in the same manner as in the determination of the amount of $MoS_2$.

The specific surface area, and the amounts of $MoS_2$, oil, matters stuck on the surface, Fe powder and a Fe compound, and a Ca compound in Inventive Examples and Comparative Examples are shown in Tables 1 and 2.

TABLE 1

| | $MoS_2$ in drawing lubricant | Coating of $MoS_2$ after drawing | Amount of $MoS_2$ on surface (g/m$^2$) | Specific surface area |
|---|---|---|---|---|
| Inventive example | | | | |
| 1 | Absence | Presence | 0.093 | 0.0218 |
| 2 | Presence | Absence | 0.087 | 0.0093 |
| 3 | Absence | Presence | 0.015 | 0.0305 |
| 4 | Absence | Presence | 0.014 | 0.0129 |
| 5 | Presence | Presence | 0.025 | 0.0176 |
| 6 | Absence | Presence | 0.103 | 0.0282 |
| 7 | Absence | Presence | 0.181 | 0.0102 |
| 8 | Absence | Presence | 0.072 | 0.0143 |
| Comparative example | | | | |
| 1 | Absence | Absence | <0.001 | 0.0385 |
| 2 | Presence | Presence | 0.264 | 0.0260 |
| 3 | Presence | Presence | 0.253 | 0.0392 |
| 4 | Presence | Absence | 0.002 | 0.0039 |
| 5 | Absence | Absence | <0.001 | 0.0405 |
| 6 | Presence | Absence | 0.008 | 0.0041 |
| 7 | Presence | Presence | 0.296 | 0.0391 |
| 8 | Presence | Absence | 0.153 | 0.0042 |

TABLE 2

| | Amount of oil on surface (g/m$^2$) | Amount of matters stuck on surface (g/m$^2$) | Amount of Fe powder and Fe compound (g/m$^2$) | Amount of Ca compound (g/m$^2$) |
|---|---|---|---|---|
| Inventive example | | | | |
| 1 | 0.03 | 0.65 | 0.12 | 0.203 |
| 2 | 0.05 | 1.01 | 0.24 | 0.051 |
| 3 | 0.02 | 0.63 | 0.17 | 0.071 |
| 4 | 0.29 | 0.66 | 0.08 | 0.183 |
| 5 | 0.39 | 0.72 | 0.16 | 0.194 |
| 6 | 0.01 | 0.68 | 0.09 | 0.019 |
| 7 | 0.21 | 0.41 | 0.10 | 0.019 |
| 8 | 0.30 | 0.35 | <0.01 | 0.092 |
| Comparative example | | | | |
| 1 | 0.20 | 0.91 | 0.20 | 0.189 |
| 2 | 0.53 | 0.85 | 0.21 | 0.215 |
| 3 | 0.16 | 1.21 | 0.29 | 0.259 |
| 4 | 0.03 | 0.51 | 0.03 | 0.009 |
| 5 | 0.25 | 1.04 | 0.18 | 0.126 |
| 6 | 0.12 | 0.71 | 0.17 | 0.082 |
| 7 | 0.05 | 1.10 | 0.09 | 0.017 |
| 8 | 0.69 | 0.91 | 0.16 | 0.022 |

The wires in Inventive Examples and Comparative Examples were examined in terms of rust resistance, continuous weldability and the amount of diffusible hydrogen. The results are summarized in Table 3. The rust resistance test was carried out in a thermo-hygrostat at a temperature of 30° C. and at a moisture of 80%. In Table 3, the mark (x) indicates the case where dotted rust are generated after an elapse of 672 hr, and the mark (○) indicates the case where no rust is generated. As for the continuous weldability, each wire was continuously welded at a suitable current and a suitable voltage, and feeding resistances after elapse of 15 min and 60 min were compared with that upon start of welding. In Table 3, the mark (◎) indicates the case where the percentage obtained by the following equation is 0 (%), the mark (○) indicates the case where it is in the range of 0 to 5%, the mark (Δ) indicates the case where it is in the range of 5 to 10%, and the mark (x) indicates the case where it is in the range of 10% or more.

{(feeding resistance after completion of welding—feeding resistance upon start of welding)/feeding resistance upon start of welding}×100

The amount of diffusible hydrogen in weld metal was measured by gas chromatography in accordance with JIS. In Table 3, as for the amount of diffusible hydrogen, the mark (○) indicates the case where the amount of diffusible hydrogen is less than 5 ml, and the mark (x) indicates the case where it is more than 5 ml. On the basis of the above results, the continuous weldability was totally evaluated. In Table 3, as for the total evaluation, the mark (○) indicates the case where the continuous weldability is excellent, and the mark (x) indicates the case where it is poor.

TABLE 3

| | Rust resistance | Continuous weldability 15 min | 60 min | Amount of diffusible hydrogen | Total evaluation |
|---|---|---|---|---|---|
| Inventive example | | | | | |
| 1 | ○ | ○ | Δ | ○ | ○ |
| 2 | ○ | ○ | ○ | ○ | ○ |
| 3 | ○ | ○ | Δ | ○ | ○ |
| 4 | ○ | ○ | ○–◎ | ○ | ○ |
| 5 | ○ | ○ | Δ–○ | ○ | ○ |
| 6 | ○ | ○ | Δ | ○ | ○ |
| 7 | ○ | ○ | ◎ | ○ | ○ |
| 8 | ○ | ○ | ◎ | ○ | ○ |
| Comparative example | | | | | |
| 1 | ○ | x | x | ○ | x |

TABLE 3-continued

|   | Rust resistance | Continuous weldability 15 min | 60 min | Amount of diffusible hydrogen | Total evaluation |
|---|---|---|---|---|---|
| 2 | X | X | X | X | X |
| 3 | X | X | X | O | X |
| 4 | X | X | X | O | X |
| 5 | O | Δ | X | O | X |
| 6 | O | Δ | X | O | X |
| 7 | X | Δ | X | O | X |
| 8 | O | Δ | X | X | X |

As is apparent from Table 3, in each of Inventive Examples 1 to 8, the continuous weldability and rust resistance are excellent, and further the amount of diffusible hydrogen is low. In particular, in each of Inventive Examples 4, 7 and 8, the continuous weldability is extremely excellent. On the other hand, in Comparative Example 1, the rust resistance is excellent because the amount of oil is suitable; however, the feedability is poor upon continuous welding. Comparative Example 2 is the case where the specific surface area is within the range of the present invention but the amounts of $MoS_2$ and oil on the surface of the wire are excessively larger, wherein the rust resistance and the continuous weldability are poor and the amount of diffusible hydrogen is large. In Comparative Example 3, the amount of diffusible hydrogen is not large because the amount of oil on the surface of the wire is suitable; however, the rust resistance and the continuous weldability are poor. In Comparative Example 4, since the amount of $MoS_2$ on the surface of the wire is small and the specific surface area is also small, the rust resistance and the continuous weldability are poor. In Comparative Example 5, the feedability can be ensured somewhat because of the presence of lubricating oil, but it is insufficient; accordingly, this wire is not suitable for continuous welding for a long term. In Comparative Example 6, the feedability is insufficient because of the small specific surface area; accordingly, this wire is not suitable for continuous welding for a long term. In Comparative Example 7, since the amount of $MoS_2$ is large, the rust resistance is poor. In Comparative Example 8, since the specific surface area is small and the amount of oil is large, the continuous weldability is poor and the amount of diffusible hydrogen in weld metal is large.

(Example B)

The Inventive Examples with respect to solid wires will be described in comparison with Comparative Examples.

(1) Specific Surface Area

Control Method

The control of the specific surface area was carried out by adjustment of shapes and the surface finishing accuracies of dies (die with hole, roller die and the like), and the size of hard particles used for a die material (WC; tungsten carbide, diamond and the like).

Measuring Method

① D Three test pieces each having a length of about 20 mm were cut from each wire wound around a spool or contained in a pack. In cutting the wire, portions having no flaw on the surface were selected. The surface of the test piece was subjected to ultrasonic cleaning using an organic solvent being less liable to corrode the test piece (for example, petroleum ether, acetone, carbon tetrachloride or freon) for removing contamination and impurities such as fats and oils stuck on the surface of the wire. In this case, to prevent the test pieces from being scratched by mutual rubbing, the ultrasonic cleaning was made for each test piece. As the cleaning liquid for ultrasonic cleaning, any of liquids suitable for removal of lubricant used for machining (hot water or other degreasing liquids) may be used in place of the above organic solvent.

② Each test piece was divided into three parts in the circumferential direction, and at each divided position, a real surface area in a region of 500 μm (vertical)×600 μm (horizontal) (apparent surface area Sm=300000 μm$^2$) was measured using an electron beam three-dimensional roughness analyzer (for example, sold by Elyonix Co., Ltd. under the trade name "ERA-8000"). The average of the measured real surface areas was calculated, and it was taken as the real surface area Sa of the wire. In addition, the measurement magnification was set at constant (150 times) irrespective of the diameter of the wire.

③ The specific surface area {(Sa/Sm)−1} of the wire was calculated on the basis of the apparent surface area Sm and the real surface area Sa.

(2) Matters stuck on Surface

Control Method (Coating Method)

$MoS_2$, C and alkali metals were dispersed or suspended in drawing lubricant or feeding lubricant to be stuck on the surface of a wire. The feeding lubricant was coated during skin pass or using an electrostatic oil coater.

Measuring Method

Amount of $MoS_2$

① First, four test pieces each having a length of 25 cm were cut from each wire. The surface of each test piece was wiped with absorbent cotton previously dipped in solvent (chloroform). In this case, the wiping of the surface of the test piece was repeated by five times using new absorbent cotton for each time.

② The absorbent cotton used for wiping of the surface of the test piece was dissolved in 50 g of an aqua regia solution {12.8 g (36 wt %) of HCl+37.16 g (60 wt %) of $HNO_3$}, and the solution was heated at 70° C.

③ The solution was added with 150 mg (three times, 50 mg for each time) of a cleaning liquid used for cleaning a vessel in which the absorbent cotton used for wiping was put. The volume of the solution added with the cleaning liquid was 1000 ml.

④ The concentration of Mo in the solution added with the cleaning liquid was measured by an atomic absorption analysis or induction coupling plasma (ICP) method.

⑤ On the basis of the concentration of Mo thus measured, the amount of $MoS_2$ per unit area (1 m$^2$) on the surface of a wire was calculated. In calculating the surface area of the wire, the nominal size of the wire was taken as the radius thereof.

(3) Amount of Lubricating Oil

Measuring Method

The amount of lubricating oil stuck on the surface of a wire was determined as follows (in accordance with JIS K0102-25, 26):

① First, four test pieces each having a length of 25 cm were cut from a wire. The surface of each test piece was wiped with absorbent cotton previously dipped in solvent (carbon tetrachloride). In this case, the wiping of the surface of the test piece was repeated by five times using new absorbent cotton for each time.

② Carbon tetrachloride in an amount of 10 ml was added into a vessel in which the absorbent cotton for wiping was put. The liquid of carbon tetrachloride was made to be absorbed in the absorbent cotton, and was then transferred into a flask.

③ The carbon tetrachloride absorbed in the absorbent cotton was squeezed by a glass bar or the like, and the carbon tetrachloride thus squeezed was transferred into the above flask.

④ The above steps ② and ③ are repeated by three times.

⑤ The carbon tetrachloride in the above flask was transferred into a measuring flask of 50 ml. The above flask was then cleaned by carbon tetrachloride in an amount of about 10 ml, and the cleaning liquid of the carbon tetrachloride was also transferred into the measuring flask.

⑥ Carbon tetrachloride was added in the measuring flask up to the reference line (50 ml).

⑦ The oil content in the solution was determined using an infrared spectroscopic analysis (IR). In this case, the working curve was prepared in the following manner. First, the solution in the measuring flask was put in an infrared measuring cell (made of quartz) having a length of 50 mm, and was measured in the absorbing degree near a wavelength of 3.4 μm. The lubricating oil to be measured in an amount of 2 g was then diluted in 200 ml by addition of carbon tetrachloride, thus obtaining a diluted solution (S1). The diluted solution S1 in an amount of 2 ml was added with carbon tetrachloride to be diluted in 200 ml, thus obtaining a diluted solution S2. The diluted solution S2 in each of the amounts of 2 ml, 10 ml and 40 ml was added with carbon tetrachloride to be diluted in 200 ml, thus obtaining each standard sample having each of the concentrations of oil in the solution of 0.002 mg/ml, 0.01 mg/ml and 0.04 mg/ml.

The standard sample was measured by the infrared spectroscopic analysis, to thus obtain the working curve. Using the working curve thus obtained, the amount of the lubricating oil on the surface of the test piece was measured. On the basis of the amount of the lubricating oil thus measured, the oil content per unit surface area of the wire was calculated. In calculating the surface area of the wire, the nominal size of the wire was taken as the radius thereof.

(4) Alkali Metal Measuring Method

The measurement was carried out in the same manner as in (2).

(5) Amount of Oxygen in Wire Measuring Method

A surface layer portion of each test piece was ground by a depth of from about 0.05 to 0.2 mm, to obtain a sample in an amount of 0.2 to 0.5 g. Using this sample, the oxygen concentration was measured in an inert gas within an impulse furnace by a melting type oxygen analysis. The oxygen concentration thus obtained is taken as a wire surface layer oxygen concentration. The oxygen concentration of the total wire was similarly measured, without grinding of the surface layer portion of a wire.

(6) Current-Carrying Stability Measuring Method

The irregularities on the surface of a wire was examined by measuring the contact electric resistance on the surface of a wire.

Figure 7:
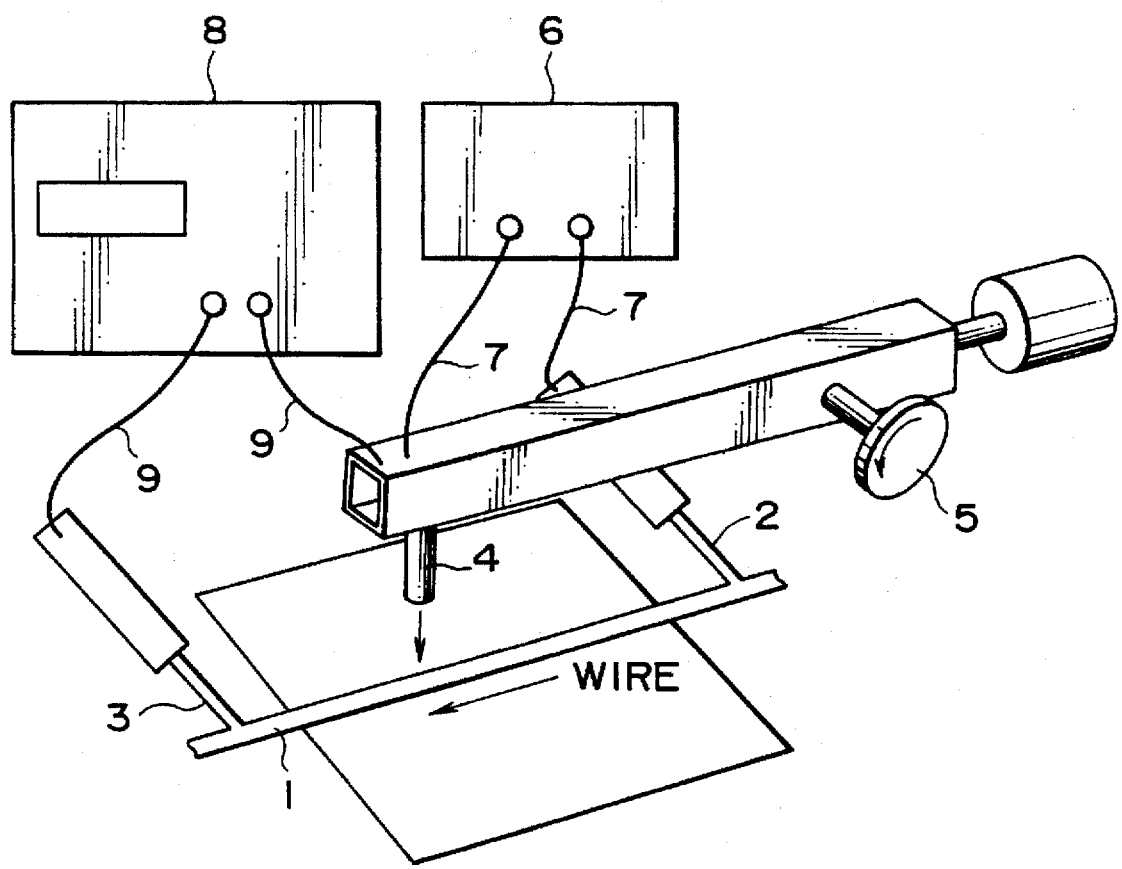
FIG. 7 is a typical view showing a device for measuring contact resistance.

The contact electric resistance on the surface of a wire can be measured by an apparatus shown in FIG. 7. This apparatus is modified from a commercially available electric contact simulator by the present inventors. A wire 1 is continuously moved in the direction of the arrow. The wire 1 is contacted with a current terminal 2 and a voltage terminal 3. The current terminal 2 is connected to a power supply 6 by way of a current lead 7. The voltage terminal 3 is connected to a contact electric resistance meter 8 by way of a voltage lead 9. An electrode 4 is contacted with the surface portion of the wire between the current terminal 2 and the voltage terminal 3 while being applied with a suitable load by a loading mechanism 5. The electrode 4 is connected to the other terminals of the power supply 6 and the contact electric resistance meter 8 by way of the current lead 7 and the voltage lead 9.

To examine the electric non-uniformity on the surface of a wire in the longitudinal direction, it is required to measure a contact electric resistance in the longitudinal direction. Accordingly, the measurement is performed while the wire 1 is continuously moved. The voltage terminal 3 and the current terminal 2 may be fixed at both ends of the wire 1 or they may be slid along the surface of the wire 1 with the terminal positions being fixed in a manner not to exert adverse effect on the measurement of the contact electric resistance.

The measurement was preliminarily carried out at a moving rate of the wire 1 in the range of from 1 mm/min to 10 m/min. As a result, it was confirmed that for a moving rate ranging from 1 mm/min to 50 cm/min, the measurement is possible but it takes a lot of time; while for a moving rate ranging from 5 m/min to 10 m/min, the measurement is possible but there occurs a problem in terms of accuracy due to vibration. This preliminary measurement showed that a suitable moving rate of the wire 1 is in the range of from 50 cm/min to 5 m/min. And, in the present invention, the moving rate of the wire 1 was specified at a value of 1.2±0.4 m/min. The measurement was also preliminarily performed while changing the measurement current in the range of from 1 μA to 100 A. As a result, it was confirmed that for a measurement current ranging of from 1 μA to 50 mA, the contact electric resistance is possible but the measurement accuracy is low because of a large variation in electromotive force; while for a measurement current ranging from 5 A to 100 A, the measurement is possible but the higher current tends to altered, oxidize and melt the contact point between the electrode 4 and the wire 1; and further, when the current is high, the measured contact resistance values and the difference therebetween are made smaller, failing to make clear the difference between wires having different rust resistances. The suitable measurement current is in the range of from 50 mA to 5 A, and in the present invention, it is specified at a value of 0.5±0.1 A.

A potential difference (V), which was generated between the electrode 4 and the wire 1 when a current is applied, was measured by the contact electric resistance meter 8. The contact electric resistance (Ω) was calculated by dividing the above potential difference by the measurement current. The potential difference is required to be measured at measurement intervals ranging from 0.01 to 0.5 mm. The reason for this is to detect the presence of micro-sized matters remaining on the surface of a wire. The actual measurement was carried out at measurement intervals of 0.1±0.02 mm. The measurement intervals are determined to be 0.1±0.02 m/min by moving the wire 1 at a moving rate of 1.0±0.2 m/min and simultaneously measuring the contact electric resistance at specified time intervals.

The electrode 4 was made of 1%Cr-copper. As the reference electrode, the electrode 4 is desirable to be made of pure copper; however, pure copper is large in wear. Even in the case of using the electrode 4 made of the other copper alloy, the measured contact electric resistance was substantially the same as in the case of using the electrode 4 made of 1%Cr-copper. As for the electrode 4, the thickness was 2 mm, the leading edge was formed with a curvature of 1 mmR, and the surface was ground by an emery paper (#400). The electrode 4 was pressed on the wire 1 by the loading mechanism 5 at a force of 0.49±0.05N (50±5 gf). When the above pressing force was made larger, the contact electric resistance value on the whole surface of a wire was made smaller, so that the degree of the electric non-uniformity was made smaller. On the other hand, when it was made smaller, the electric non-uniformity on the surface of the wire was excessively made larger. The relative moving rate between the wire 1 and the electrode 4 was specified at 1.0±0.2 m/min. At this moving rate, the wire having a length of 50 mm can be measured for 3 seconds. Actually, the measurement of the wire was performed over the whole length of about 4 m, and the measured values in an arbitrary portion having a length of 50 mm may be statistically processed by a computer. The contact electric resistance of the wire may be linearly measured. It may be measured in a spiral or zigzag manner, if needed. Namely, irrespective of the measurement locus, the contact electric resistances may be sequentially measured over the whole length of 50 mm of the wire; however, for convenience in terms of the measurement apparatus, the measurement is preferably made linearly. The data thus obtained were processed by the computer, thus obtaining the average value and the standard deviation (STD).

Evaluating Method

The measurement was made for a length of 10000 mm in the longitudinal direction.

As for current-carrying stability shown in Table 6, the mark (⊚) indicates the case where the average contact resistance is 400 mΩ or less and the standard deviation thereof is less than 100 mΩ; the mark (◯) indicates the case where the average contact resistance is 400 mΩ or less and the standard deviation thereof is in the range of 100 to 200 mΩ; and the mark (Δ) indicates the case where the average contact resistance is 400 mΩ or less and the standard deviation thereof is 200 mΩ or more.

(7) Evaluation Method for Wire Feedability

Welding Condition

Welding Current: 80 to 500 A

Welding Voltage: suitable voltage (arc extension=about 2 mm)

Shield Gas: $CO_2$, Ar-20%$CO_2$, or Ar-2%$O_2$ (25 l/min for each case)

Figure 8:
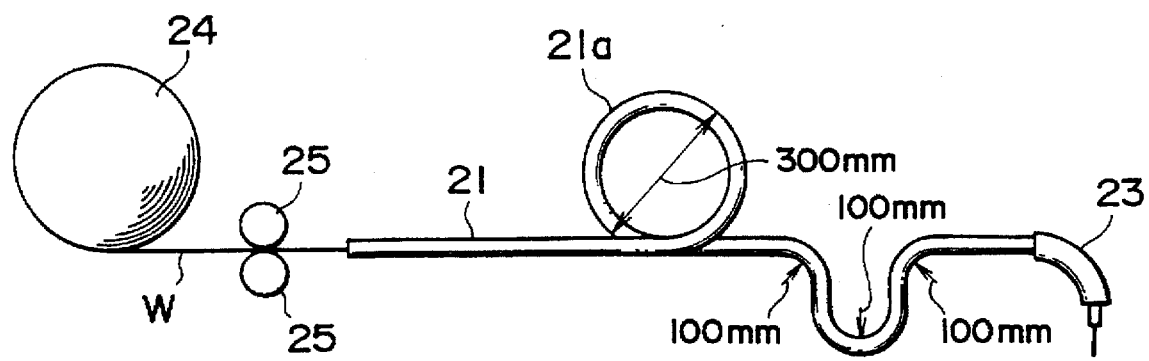
Figure 9:
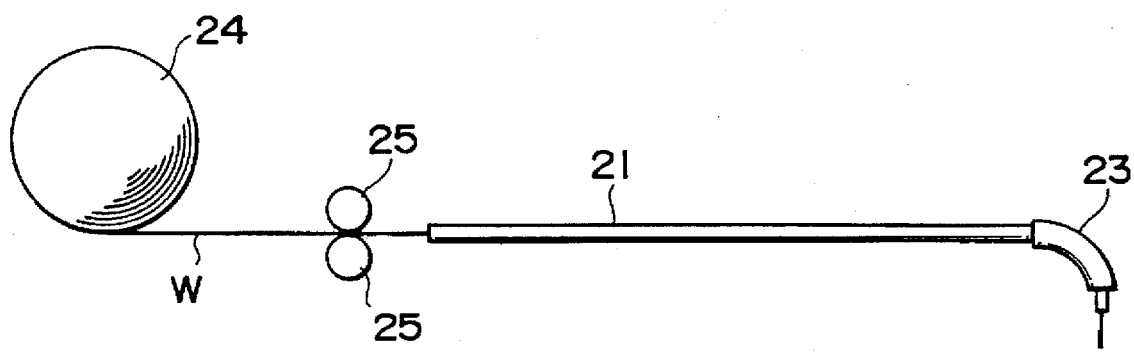

The feedability was measured by an apparatus shown in FIGS. 8 and 9. Namely, as shown in FIG. 8, in a conduit tube 21 having a length of 6 m, a loop 21a (three turns) having a diameter of 300 mm was formed at the central portion; three curve portions each having a curvature of 0.01 (R=100 mm) were formed near the leading edge; and a curved torch 23 was mounted at the leading edge. Each test wire W wound around a wire spool 24 was fed into the conduit tube 21 by feeding rolls 25. In such a state, the feeding resistance applied to the feeding rolls 25 was measured, thus obtaining the average feeding resistance. In addition, FIG. 8 shows the apparatus set to be in a severe feeding system; and FIG. 9 shows the apparatus set to be in a normal feeding system where the conduit tube is made linear.

Evaluation Reference Average Feeding Resistance:

⊚+: less than 4 kgf even in the severe feeding system

⊚: 2 to 3 kgf

◯: 3 to 4 kgf

Δ: 4 kgf or more (8) Evaluation for Arc Stability

Sensory Evaluation by Welder

⊚++: excellent

⊚+: good (+)

⊚: good (–)

Δ: slightly poor (9) Evaluation Method for Rust Resistance

Leaving Atmosphere: 30° C-80 R.H %

Evaluation Reference:

◯: dotted rust never generated within one month

Δ: dotted rust generated on whole surface within one month

(10) Amount of Matters Stuck on Surface

The difference in weight between wires before and after wiping obtained in (1) regarding the measurement of $MoS_2$ was taken as the amount of matters stuck on the surface of the wire.

(11) Measurement of Amount of Clogging Matters

This was evaluated by an increase in weight with respect to the roller, guide roller, conduit tube, inner liner, inner tube, and tip after welding for one hour.

⊚: 1.0 g/m² or less

◯: 1.0 to 2.0 g/m²

Δ: 2.0 g/m² or more (failure)

(12) Measurement of Amount of Diffusible hydrogen

The amount of diffusible hydrogen in weld metal was measured by gas chromatography in accordance with JIS.

◯: less than 5 ml/100 g

Δ: 5 ml/100 g or more

(13) Test Wire Material

JIS YGW-11 (diameter: 0.9–1.6 mm)

JIS YGW-12 (diameter: 0.9–1.6 mm)

The compositions of the above wire materials are shown in Table 4. Moreover, the kind of wires, specific surface area, and amounts of $MoS_2$ and lubricating oil with respect to each test wire are shown in Table 5. The results of performance evaluation in Inventive Examples and Comparative Examples are shown in Table 6.

TABLE 4

| (wt %) | | | | | |
|---|---|---|---|---|---|
| C | Si | Mn | P | S | Ti |
| YGW-11 series ($CO_2$) | | | | | |
| 0.06 | 0.82 | 1.49 | 0.010 | 0.011 | 0.17 |
| YGW-12 series (CO2) | | | | | |
| 0.07 | 0.82 | 1.40 | 0.010 | 0.011 | tr. |

TABLE 5

| | Kind of wire* | Specific surface area | Amount of $MoS_2$ (g/m²) | Amount of lubricating oil (g/m²) | Remarks |
|---|---|---|---|---|---|
| Conventional example 1 | 1 | 0.005 | — | 0.05 | |
| Conventional example 2 | 1 | 0.005 | — | 0.05 | Intergranular oxidized wire |
| Comparative example 3 | 2 | 0.0001 | 0.05 | 0.05 | |
| Comparative example 4 | 2 | 0.0001 | 0.30 | 0.05 | |
| Comparative example 5 | 2 | 0.0001 | 0.60 | 0.05 | |
| Inventive example 6 | 2 | 0.01 | 0.05 | 0.05 | |
| Comparative example 7 | 2 | 0.01 | 0.0005 | 0.05 | |
| Comparative example 8 | 2 | 0.01 | 0.60 | 0.05 | |

TABLE 5-continued

| | | | | | |
|---|---|---|---|---|---|
| Inventive example 9 | 2 | 0.04 | 0.05 | 0.05 | |
| Comparative example 10 | 2 | 0.06 | 0.05 | 0.05 | |
| Inventive example 11 | 2 | 0.005 | 0.05 | 0.05 | |
| Inventive example 12 | 2 | 0.005 | 0.20 | 0.05 | |
| Inventive example 13 | 2 | 0.005 | 0.30 | 0.05 | |
| Comparative example 14 | 2 | 0.01 | 0.05 | 0.60 | |
| Comparative example 15 | 2 | 0.01 | 0.05 | 0.005 | |
| Inventive example 16 | 2 | 0.01 | 0.05 | 0.02 | |
| Inventive example 17 | 3 | 0.01 | 0.05 | 0.05 | |
| Inventive example 18 | 2 | 0.02 | 0.04 | 0.05 | MAG welding (Ar-20% $CO_2$) |
| Conventional example 19 | 4 | 0.006 | — | 0.05 | |
| Inventive example 20 | 5 | 0.03 | 0.05 | 0.05 | |

| | Kind of wire* | Amount of alkali metal (mol/m$^2$) | Amount of C (g/m$^2$) | Amount of wiped-off matters (g/m$^2$) | Amount of oxygen (ppm) Surface layer | Amount of oxygen (ppm) Whole wire |
|---|---|---|---|---|---|---|
| Inventive example 21 | A | —** | — | 0.48 | 32 | 25 |
| Inventive example 22 | A | 0.0005 | — | 0.50 | 34 | 28 |
| Inventive example 23 | A | 0.005 | — | 0.49 | 30 | 28 |
| Inventive example 24 | A | 0.01 | — | 0.70 | 31 | 31 |
| Comparative example 25 | A | 0.02 | — | 0.90 | 30 | 31 |
| Inventive example 26 | A | — | 0.001 | 0.50 | 32 | 30 |
| Inventive example 27 | A | — | 0.03 | 0.75 | 34 | 29 |
| Comparative example 28 | A | — | 0.04 | 0.91 | 30 | 26 |
| Inventive example 29 | A | 0.01 | 0.03 | 1.10 | 32 | 27 |
| Comparative example 30 | A | 0.01 | 0.03 | 2.50 | 33 | 29 |
| Inventive example 31 | B | — | — | 0.51 | 120 | 30 |
| Inventive example 32 | B | — | — | 0.55 | 800 | 40 |
| Comparative example 33 | B | — | — | 0.50 | 1200 | 55 |
| Comparative example 34 | B | — | — | 0.49 | 800 | 80 |

*1 wire material: YGW-11 series, wire diameter: 1.2 mm, and plating: applied
2 wire material: YGW-11 series, wire diameter: 1.2 mm, and plating: not applied
3 wire material: YGW-11 series, wire diameter: 1.6 mm, and plating: not applied
4 wire material: YGW-12 series, wire diameter: 1.2 mm, and plating: applied
5 wire material: YGW-12 series, wire diameter: 1.2 mm, and plating: not applied
A equivalent to Inventive example 6 (In Inventive example 6, one or more of the amounts of alkali metals, carbon, wiped-of matters and oxygen are controlled).
B equivalent to Inventive example 9 (In Inventive example 9, one or more of the amounts of alkali metals, carbon, wiped-off matters and oxygen are controlled).
** The mark "—" means that alkali metal or carbon (C) is not positively added.

TABLE 6

| | Performance evaluation | | | | | | |
|---|---|---|---|---|---|---|---|
| | Wire feed-ability | Arc stabil-ity | Current-carrying stability | Amount of diffusible hydrogen | Amount of clogged matters | Rust resis-tance | Total evalu-ation |
| Conventional example 1 | ⊙ | Δ | Δ | ○ | ○ | ○ | Δ |
| Conventional example 2 | ⊙ | ○ | Δ | ○ | ○ | ○ | Δ |
| Comparative example 3 | ⊙ | Δ | Δ | ○ | ⊙ | ○ | Δ |
| Comparative example 4 | ⊙ | Δ | Δ | ○ | ○ | ○ | Δ |
| Comparative example 5 | ⊙ | Δ | Δ | ○ | Δ | ○ | Δ |
| Inventive example 6 | ⊙ | ⊙ | ⊙ | ○ | ⊙ | ○ | ⊙ |
| Comparative example 7 | ⊙ | Δ | Δ | ○ | ⊙ | ○ | Δ |
| Comparative example 8 | ⊙ | Δ | Δ | ○ | Δ | ○ | Δ |
| Inventive example 9 | ⊙ | ⊙ | ⊙ | ○ | ⊙ | ○ | ⊙ |
| Comparative example 10 | Δ | Δ | ○ | ○ | ⊙ | ○ | Δ |
| Inventive example 11 | ⊙ | ⊙ | ⊙ | ○ | ⊙ | ○ | ⊙ |
| Inventive example 12 | ⊙ | ⊙ | ⊙ | ○ | ○ | ○ | ⊙ |
| Inventive example 13 | ⊙ | ⊙ | ⊙ | ○ | ○ | ○ | ⊙ |
| Comparative example 14 | ⊙ | ○ | Δ | Δ | ⊙ | ○ | Δ |
| Comparative example 15 | ○ | ○ | ○ | ○ | ⊙ | Δ | Δ |
| Inventive example 16 | ○ | ○ | ○ | ○ | ⊙ | ○ | ○ |
| Inventive example 17 | ⊙ | ⊙ | ⊙ | ○ | ⊙ | ○ | ⊙ |
| Inventive example 18 | ⊙ | ⊙ | ⊙ | ○ | ⊙ | ○ | ⊙ |
| Conventional example 19 | ⊙ | Δ | Δ | ○ | Δ | ○ | Δ |
| Inventive example 20 | ⊙ | ⊙ | ⊙ | ○ | ○ | ○ | Δ |
| Inventive example 21 | ⊙ | ⊙ | ⊙ | ○ | ⊙ | ○ | ⊙ |
| Inventive example 22 | ⊙ | ⊙+ | ⊙ | ○ | ⊙ | ○ | ⊙+ |
| Inventive example 23 | ⊙ | ⊙++ | ⊙ | ○ | ○ | ○ | ⊙++ |
| Inventive example 24 | ⊙ | ⊙++ | ⊙ | ○ | ○ | ○ | ⊙++ |

TABLE 6-continued

|  | Performance evaluation | | | | | | |
| --- | --- | --- | --- | --- | --- | --- | --- |
|  | Wire feed-ability | Arc stabil-ity | Current-carrying stability | Amount of diffusible hydrogen | Amount of clogged matters | Rust resis-tance | Total evalu-ation |
| Comparative example 25 | ⊚ | △ | △ | △ | △ | △ | △ |
| Inventive example 26 | ⊚ | ⊚+ | ⊚+ | ○ | ⊚ | ○ | ⊚+ |
| Inventive example 27 | ⊚ | ⊚+ | ⊚+ | ○ | ○ | ○ | ⊚+ |
| Comparative example 28 | ⊚ | ○ | ○ | ○ | △ | ○ | △ |
| Inventive example 29 | ○ | ○ | ○ | ○ | ○ | ○ | ○ |
| Comparative example 30 | △ | △ | △ | △ | △ | △ | △ |
| Inventive example 31 | ⊚+ | ⊚+ | ⊚ | ○ | ⊚ | ○ | ⊚+ |
| Inventive example 32 | ⊚+ | ⊚+ | ⊚ | ○ | ⊚ | ○ | ⊚+ |
| Comparative example 33 | ⊚+ | △ | ⊚ | ○ | ⊚ | ○ | △ |
| Comparative example 34 | ⊚+ | △ | ⊚ | ○ | ⊚ | ○ | △ |

As is apparent from Table 6, in each of Inventive Examples, the wire feedability is excellent and also the current-carrying stability is excellent.

As described above, in the flux-cored wire and solid wire of the present invention, since the specific surface area is within the specific range and MoS$_2$ in a specified amount is stuck on the surface of the wire, the wire feedability and arc stability are excellent and also the rust resistance is excellent; and further, the amount of diffusible hydrogen in weld metal can be reduced and the high temperature cracking is difficult to be generated. The present invention, therefore, enables continuous welding using a robot or the like, and greatly contributes to the improvement in welding operation.

What is claimed is:

1. A solid wire for arc welding wherein a specific surface area defined by the following equation is in the range of from 0.0005 to 0.05, specific surface area equals (Sa/Sm)−1 wherein Sm is an apparent surface area and Sa is a real surface area in a region to be measured on a surface of said wire, and wherein molybdenum disulfide is stuck on said surface of said wire in an amount of from about 0.001 to 0.5 g/m$^2$ and no plating is applied on said surface of said wire, and wherein lubricating oil is stuck on said surface of said wire in an mount of from about 0.01 to 0.5 g/m$^2$, and wherein an mount of matter stock on said surface of said wire is about 2.0 g/m$^2$ or less, and further wherein the concentration of oxygen in a surface area of said wire is in the range of from about 100 to 1,000 ppm, and the avenge concentration of oxygen in the wire is about 70 ppm or less.

2. The solid wire of claim 1, wherein said amount of matter stuck on said surface of said wire is about 1.0 g/m$^2$ or less.

3. The solid wire of claim 1, wherein said molybdenum disulfide has an average particle size of from about 0.1 to 10 μm.

4. A solid wire for arc welding wherein a specific surface area defined by the following equation is in the range of from about 0.005 to 0.05, specific surface area equals (Sa/Sm)−1 wherein Sm is an apparent surface area and Sa is a real surface area in a region to be measured on the surface of said wire, wherein molybdenum disulfide is stuck on said surface of said wire in an amount of from about 0.001 to 0.5 g/m$^2$, and no plating is applied on said surface of said wire, and wherein a compound containing Li, Na, K, Rb or Cs or a mixture thereof is stuck on said surface of said wire in an amount of from about 0.0005 to 0.01 mol/m$^2$, and wherein an amount of matter stuck on said surface of said wire is about 2.0 g/m$^2$ of less, and further wherein the concentration of oxygen in a surface layer of said wire in the range of from about 10 to 1,000 ppm, and the average concentration of oxygen in the wire is about 70 ppm or less.

5. The solid wire of claim 4, wherein said amount of matter stuck on said surface of said wire is about 1.0 g/m$^2$ or less.

6. The solid wire of claim 4, wherein said molybdenum disulfide has an average particle size of from about 0.1 to 10 μm.

7. A solid wire for arc welding wherein a specific surface area defined by the following equation is in the range of from about 0.005 to 0.05, specific surface area equals (Sa/Sm)−1 wherein Sm is an apparent surface area and Sa is a real surface area in a region to be measured on the surface of said wire, and wherein molybdenum disulfide is stuck on said surface of said wire in an amount of from about 0.001 to 0.5 g/m$^2$, and no plating is applied on said surface of said wire, and wherein lubricating oil is stuck on said surface of said wire in an amount of from about 0.01 to 0.5 g/m$^2$, and wherein a compound containing Li, Na, K, Rb or Cr or a mixture thereof is stuck on said surface of said wire in an amount of from about 0.005 to 0.1 g/m$^2$, and wherein an amount of matter stuck on said surface of said wire is about 2.0 g/m$^2$ or less, and further wherein the oxygen in a surface area of said wire is in the range of from about 100 to 1,000 ppm, and the average concentration of oxygen in the wire is about 70 ppm or less.

8. The solid wire of claim 7, wherein said amount of matter stuck on said surface of said wire is about 1.0 g/m$^2$ or less.

9. The solid wire of claim 7, wherein said molybdenum disulfide has an average particle size of from about 0.1 to 10 μm.

* * * * *